April 5, 1927.
E. R. DRAVER
EXHAUST CUT-OUT
Original Filed Feb. 2, 1922
1,623,580
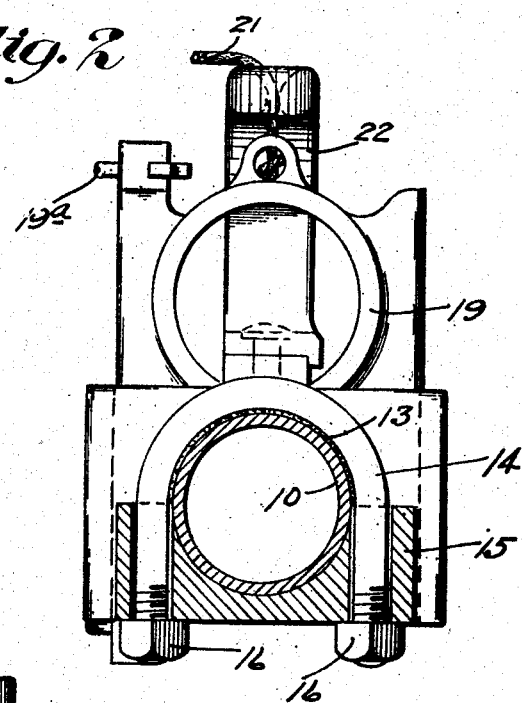
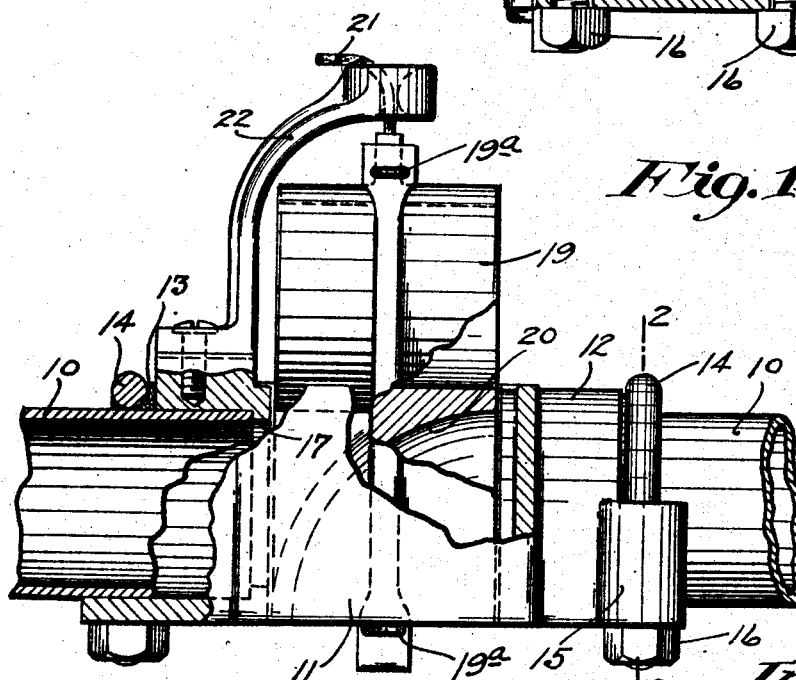
Inventor
Emil R. Draver
By his Attorneys Patented Apr. 5, 1927.

1,623,580

UNITED STATES PATENT OFFICE.

EMIL R. DRAVER, OF RICHMOND, INDIANA.

EXHAUST CUT-OUT.

Original application filed February 2, 1922, Serial No. 533,576. Divided and this application filed April 23, 1923. Serial No. 633,878.

My present invention provides an extremely simple and highly efficient exhaust cut-out for internal combustion engines such as used on automobiles or motor-propelled vehicles, and is directed particularly to an improved connection between the exhaust pipe and cut-out casing.

To the above end, generally stated, the invention consists of the novel construction, and combinations of devices hereinafter described and defined in the claim.

So far as the present invention is concerned, the valve or movable element of the cut-out may take various different forms. The cut-out casing has one or more sleeves into which the exhaust pipe is adapted to be telescoped, and the invention is directed to improved means for connecting the pipe and sleeve or sleeves of the cut-out casing in telescoped relation detachably but rigidly secured against axial separation and with a gas-tight joint between the telescoped members.

In the accompanying drawings, which illustrate the invention, like characters indicate like parts throughout the several views.

Referring to the drawings:

Fig. 1 is a view chiefly in side elevation but with some parts broken away and with some parts sectioned illustrating the invention applied to connect an exhaust cut-out to the sections of an exhaust pipe; and Fig. 2 is a transverse vertical section on the line 2—2 of Fig. 1.

The construction here illustrated is very similar to that illustrated in the drawings of my pending application Serial Number 533,576, filed of date February 2, 1922, and is incorporated in the present application, with certain modifications thereof, in compliance with the examiner's request for division made in said prior application.

The construction here illustrated may be quite briefly described as follows:

The numeral 10 indicates an exhaust pipe of an internal combustion engine, which pipe has been sectioned or cut, and its severed ends axially separated to form a gap. In this particular construction illustrated, this gap is spanned by a rectangular yoke-like cut-out casing 11 that is open at top and bottom and provided with axially aligned sleeves 12 into which the severed ends of the exhaust pipe sections are telescoped. The sleeves 12 are formed with segmental lug-forming portions 15 that are offset outward of or beyond the sleeves proper, and the said sleeves have enlarged interior bores for the reception of the ends of the pipe sections and these bores are formed with internal annular shoulders 17 against which the ends of the pipe sections are closely engaged or tightly pressed to form tight joints. The lug-forming portion 15 is formed with parallel passages through which the threaded prongs of the U-bolts 14 are passed, and the threaded ends of these bolts are provided with nuts 16. Pliable packing strips 13, of asbestos or the like, are tightly clamped by the bowed portions of the U-bolts against the pipe sections and against the outer ends of the sleeves 12, thus forming gas-tight joints at the place of their application. Moreover, when the nuts 16 of the U-bolts are tightened, the inner ends of the pipe sections are tightly and closely held against shoulders 17, so that tight joints are formed at the two places noted, to prevent the escape of exhaust gases.

Moreover, it will be seen that the pipe sections, without being provided with threads or the like, are, by their telescoped engagement with the sleeves of the cut-out casing, well anchored to the casing against angular or bending movements. Moreover, the clamping action of the U-bolts tightly seats the pipe sections against the concave inner surfaces of the lug-forming portions 15, thereby further securing the pipe sections very rigidly but detachably to the casing.

The numeral 19 indicates a vertically movable cut-out valve mounted in the yoke-like casing 11 and provided with a deflecting surface 20, which, when the valve is raised as shown in Fig. 1, deflects the exhaust gases downward. The body of the valve 19 is tubular, so that when it is lowered, it will register with the sleeves 12 and thereby carry the exhaust gases from the one pipe section 10 to the other. The numeral 21 indicates a valve-lifting cable which, as shown, extends through the eye of a guide bracket 22 secured on one of the sleeves of the cut-out casing. The numeral 19ª indicates stops applied to the cut-out valve for limiting its upward and downward movements.

What I claim is:

The combination with a valve casing having axially spaced and aligned sleeves with segmental portions, of exhaust pipe sections telescoped into said sleeves, nut-equipped U-bolts applied to the segmental portions of said sleeves and clamping said pipe sections, a valve working in said casing between said U-bolts and movable from one position in which the exhaust gases will be passed through both of said U-bolts to another position in which the exhaust gases will be directed from said casing at a point between said U-bolts, said sleeves having stops preventing said pipe sections from being telescoped completely through the same, and means located outward of said joints and cooperating with said U-bolts to form gas-tight joints between the pipe sections and sleeves.

In testimony whereof I affix my signature.

EMIL R. DRAVER.